United States Patent Office 3,493,065
Patented Feb. 3, 1970

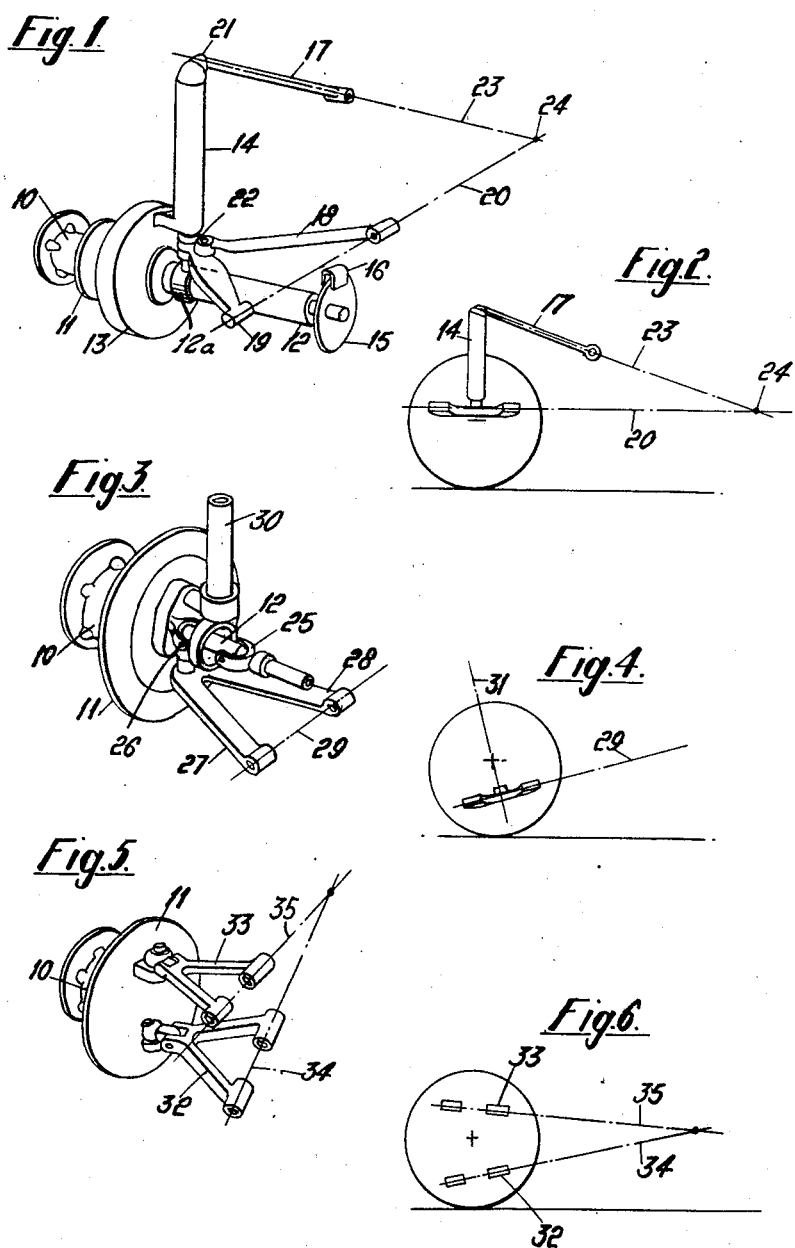

3,493,065
ANTI-DIVE SUSPENSION FOR AN INBOARD BRAKED DRIVEN WHEEL
Horace James Burnham, Nantwich, England, assignor to Rolls-Royce Limited, Derby, England, a British company
Filed Aug. 7, 1967, Ser. No. 658,697
Claims priority, application Great Britain, Aug. 12, 1966, 36,098/66
Int. Cl. B60k *17/30;* B60g *9/00*
U.S. Cl. 180—43                           5 Claims

ABSTRACT OF THE DISCLOSURE

A vehicle wheel suspension for a vehicle wheel having an inboard brake which may also be a driven wheel. The suspension comprises a number of struts arranged so that the instantaneous center about which wheel movement takes place lies on the wheelbase side of the wheel and above the wheel axis height or on the side of the wheel away from the wheelbase and below the wheel axis height. This arrangement provides an anti-dive suspension for an inboard braked wheel.

---

This invention relates to a vehicle wheel suspension.

Throughout this specification the virtual center of a vehicle wheel suspension is to be taken to mean the center about which upward or downward motion of the wheel axis instantaueously takes place when viewed at right angles to the vertical fore and aft plane of the vehicle.

The term inboard brake is again to be taken to mean a brake whose reaction is taken by structure other than the wheel carrying structure.

When a vehicle such as a motor car is accelerated or decelerated the resulting horizontal force considered to be acting through the center of gravity of the vehicle results in a couple which is resisted by another couple originating from a change in weight distribution between the front and rear wheels.

On simple suspension designs nothing is done to compensate for these effects and as a result one end of the car dives while the other end lifts on braking or acceleration.

More sophisticated designs with outboard brakes, that is brakes whose reaction is taken through the wheel suspension, are arranged so that the braking force is transmitted to the body to provide a vertical component which opposes the tendency toward dive or lift. The normal expedient used to achieve this effect in the case of front wheels when the virtual center lies within the vehicle wheelbase is to arrange that the virtual center of the wheel suspension lies above the ground surface and below the center of the wheel.

A simple way to visualise the effect of this arrangement is to visualise the braking force along the line from the point of contact of the road and the wheel to the virtual center of the suspension. In this case the braking force has an upward component and hence reduces the dive of the vehicle on braking.

When such a suspension is used with inboard brakes, the driving or braking force can no longer be assumed to act on the vehicle at the point of contact with the tyre and the road but must be considered to act horisontally at the wheel center. This may be most easily appreciated for the case of inboard and outboard brakes.

Thus the outboard brakes when the brakes are applied there is instantaneously a rigid connection between the point of contact of the tyre and the road, and the wheel suspension, therefore forces are transmitted from this point of contact directly into the suspension. On the other hand with inboard brakes the wheel axle is merely carried in bearings by the wheel suspension and therefore there is no rigid path between the points of contact and the suspension. The braking force must therefore be considered to act at the wheel center.

The effect of this change of point of application of the braking or accelerating force is to change what would be a suspension which provides an anti-dive force in the case of a non-driven outboard braked wheel into a suspension which actually increases the amount of dive or lift in the case of an inboard braked or driven wheel.

Again using the visualisation referred to above, the braking force, or the accelerating force in the case of a driven wheel, acts along the line from the wheel center to the virtual center. If the virtual center is below the wheel center, the braking force on a front wheel will have a downward component and will enhance the dive, while the accelerating force on a front wheel will have an upward component and will enhance lift.

It will be appreciated that in the case of rear wheels the opposite actions occur; thus on braking the rear end lifts and a downward force is required to reduce this effect while on accelerating the rear end "squats" and an upward force is required.

I have found that these shortcomings may be avoided by arranging the suspension such that the virtual center is positioned in certain relation to the wheel center.

According to the present invention a vehicle wheel suspension for a wheel having an inboard brake, has the projection of its virtual center as herein defined on a vertical plane fore and aft of the vehicle lying on the wheelbase side of the wheel and at a greater height from the ground than the wheel axis and remaining so over the entire range of suspension movement, or lying on that side of the wheel away from the wheelbase and at a lesser height from the ground than the wheel axis and remaining so over the entire range of suspension movement.

Said suspension may comprise a laterally extending lever or wishbone pivotable about a substantially fore and aft axis, a trailing lever pivotable about a substantially lateral axis and a wheel-carrying strut interconnecting the ends of the levers remote from the pivots, the pivotting axis of the lateral lever and the center line of the trailing lever being such that their projections on to a vertical fore and aft plane of the vehicle intersect at a point lying at a greater height from the ground than the wheel axis.

In one aspect of the invention the wheel is driven and the laterally extending lever or wishbone lies wholly above the driven shaft for the wheel.

The invention may be aplied to double wishbone and MacPherson strut type suspensions.

The invention will now be particularly described merely by way of example, in the accompanying drawings in which:

FIGURE 1 shows a transverse wishbone and trailing strut type of suspension.

FIGURE 2 is a view at right angles to the vertical fore and aft plane of the vehicle having the suspension of FIGURE 1.

FIGURE 3 shows a MacPherson strut type suspension.

FIGURE 4 is a view taken in the same direction as FIGURE 2 of the FIGURE 3 embodiment.

FIGURE 5 shows a double wishbone type of suspension,

FIGURE 6 is a view taken in the same direction as FIGURE 2 of the FIGURE 5 embodiment.

Referring to FIGURE 1 a front wheel hub 10 of a motor vehicle is carried on a hub carrier comprising a backplate 11, the whole assembly rotating on an axle 12.

The axle 12 is carried in bearings in a sleeve 13, the sleeve 13 being attached to a king post 14.

At the inboard end of the axle 12 there is carried a disc 15 on which there acts a caliper unit 16, the whole forming a disc brake. Reaction forces from the caliper 16 are taken direct to the vehicle structure. The axle 12 may be driven by an engine (not shown) to transmit drive to the wheel.

The king post 14 is suspended from the vehicle by a trailing strut 17 which extends fore and aft of the vehicle and by a wishbone made up of two struts 18 and 19, the wishbone extending laterally of the vehicle and pivotting about a substantially fore and aft axis 20. Ball joints 21 and 22 locate the struts 17 and the wishbone respectively to the king post 14. If desired a universal joint 12a may be included in the axle 12 to enable the wheel hub 10 to make steering movements.

FIGURE 2 is a sketch of the suspension of FIGURE 1 when viewed at right angles to the vertical fore and aft plane of the vehicle. It will be seen that the axis 20 and the extended center line 23 of the strut 17 meet in a point 24 when viewed from this angle. Instantaneous upward or downward movement of the wheel and the wheel hub 10 take place about this point 24 and in fact this point is the virtual center of the suspension.

It will be seen that by arranging that the axis 20 lies above the wheel center this suspension can be arranged to have its virtual center above the wheel center at all times, provided of course that the suspension is such as to prevent the wheel center moving above this axis 20. Bump stops or other devices are provided to prevent the wheel center moving above the axis 20.

FIGURE 3 shows a front wheel hub of a motor vehicle on a backplate 11 and an axle 12. In this case the axle has universal joints 25 and 26 which enable the wheel hub 10 to make steering movements. There is an inboard brake as shown in FIGURE 1 and there may be drive taken to the wheel hub through the axle 12 from an engine (not shown).

In order to suspend the wheel hub 10 from the vehicle body there is provided a wishbone made up of two struts 27 and 28 and pivotting about an axis 29. This wishbone is rotatably connected to the wheel hub at its outer extremity and acts in conjunction with a strut 30 which is a telescopic strut of the MacPherson type and is rigidly connected to vehicle structure at its upward extremity. A complete description of the MacPherson type strut may be found in the U.S. Patent No. 2,624,592 issued Jan. 6, 1953 to E. S. MacPherson. This strut 30 may be used to embody coaxial telescopic dampers and coaxial coil springs for the suspension. The lower extremity of the strut 30 is rotatably connected to the wheel hub 10 and the wishbone.

In FIGURE 4 the suspension is viewed from right angles to the vertical fore and aft plane of the vehicle. The axis 29 of the wishbone is indicated by a chain dotted line as is the center line 31 of the strut 30. The analysis of the virtual center is more difficult in this case but it must evidently lie on the line 29 and it is in fact found to be at infinity on the extension of the line 29 in the rearward direction. Evidently as long as the line 29 is at an angle to the horizontal such that it departs from the ground in a rearward direction, the virtual center will lie above the wheel center under all conditions of the suspension.

FIGURE 5 again shows the front wheel hub 10 and backplate 11 and again the axle arrangement is similar to the previous figures although it is not shown in FIGURE 5. The wheel hub 10 is suspended from the vehicle by a pair of wishbones 32 and 33 pivotting about substantially fore and aft axes 34 and 35 respectively.

FIGURE 6 is again a view at right angles to the vertical fore and aft plane of the vehicle showing the axes 34 and 35 of the wishbones 33 and 32. These axes 34 and 35 meet in a point 36 and this point is the virtual center of the suspension. Again this point lies above the wheel center and provided the bump stops etc. are correctly arranged the point 36 will always lie above the wheel center.

It should be particularly noted that in the embodiment described above the wheels involved are in each case the front wheels of the vehicle in question and in the side view (FIGURES 2, 4 and 6) the front of the vehicle is to the left.

Therefore the virtual center in these embodiments lies on the wheelbase side of the wheel.

If the virtual center lies in front of the front wheels it is on that side of the wheel distant from the wheelbase and in this case the virtual center must lie below the wheel center. This may be easily visualized by consideration of the braking force which acts along the line joining the virtual center and the wheel center. It will be seen that the virtual center must lie in one of the sectors (a) on the wheelbase side of the front wheel and above the wheel center or (b) on the other side of the front wheel and below the wheel center so as to produce an anti-drive component.

In the case of rear wheels an anti-lift component is required and the position of the virtual center to afford this must be within either the sectors (c) on the wheelbase side of the rear wheel and above the wheel center or (d) on the other side of the rear wheel and below the wheel center.

I claim:
1. A vehicle wheel suspension comprising a wheel hub, a drive axle connected to said wheel hub and transmitting rotational energy thereto, a hub carrier rotatably carrying said hub and axle, inboard brake means mounted on said drive axle inwardly of said hub carrier for braking said wheel hub, and strut means attached to said hub carrier and to said vehicle in a manner permitting upward and downward movement of said hub carrier with respect to said vehicle, the attachment of said strut means to said hub carrier including means secured in part at a point on said hub carrier having a predetermined vertical spaced relationship with respect to the rotational axis of said hub, said strut means being disposed in part in a first plane transverse to plane of motion of said strut means and transverse to the vertical fore and aft plane of said vehicle, said first plane having a predetermined angular relationship with the horizontal plane containing said hub rotational axis, said first plane containing the virtual center about which said hub carrier has said upward and downward motion over the entire range of suspension movement, said virtual center being on the wheelbase side of the vehicle and above said hub rotational axes.

2. The vehicle wheel suspension as defined in claim 1 in which said strut means comprises a lever extending laterally of said vehicle and pivotally attached at one end to said vehicle so that said lever pivots about an axis extending substantially longitudinally of said vehicle, a trailing lever extending longitudinally of said vehicle and pivotally mounted to said vehicle such that said trailing lever pivots about an axis lateral to said vehicle, and a wheel carrying strut interconnecting the ends of said lever and said trailing lever remote from the ends of said levers attached to said vehicle, said wheel carrying strut supporting said hub carrier on said vehicle, said lever and said trailing lever being attached to said wheel carrying strut at a point where the longitudinal axis of said trailing lever and the pivotal axis of said lever intersect at said virtual center and said virtual center lies within the wheelbase of the vehicle.

3. A vehicle wheel suspension as defined in claim 1 wherein said strut means comprises upper and lower wishbone levers extending laterally inward of the vehicle, said levers having bifurcated ends pivotally attached to said vehicle about upper and lower pivotal axes extending longitudinally of the vehicle respectively, the ends of said wishbone levers remote from said bifurcated ends being pivotally attached to said hub carrier, said upper and lower pivotal axes converge in a rearward direction with respect to the direction of travel of the vehicle and intersect at said virtual center.

4. A vehicle wheel suspension as defined in claim 1 wherein said strut means comprises an upwardly extending telescopic strut rigidly attached to the vehicle at the upper extremity of said strut and attached to said hub carrier at the lower extremity of said strut, and a laterally extending wishbone lever having a bifurcated end, said end being pivotally attached to the vehicle about an axis extending longitudinally of the vehicle and the end of said wishbone lever remote from said bifurcated end being pivotally attached to the hub carrier, said longitudinally extending pivotal axis diverging from the ground in a rearward direction with respect to the normal direction of motion of the vehicle and intersecting said virtual center.

5. The vehicle wheel suspension as defined in claim 4 and in which said telescopic strut comprises a telescopic damper means and a coaxial coil spring surrounding said telescopic damper means.

References Cited
UNITED STATES PATENTS

| | | | |
|---|---|---|---|
| 2,130,288 | 9/1938 | Olley | 280—89.2 |
| 2,226,406 | 12/1940 | Krotz. | |
| 2,624,592 | 1/1953 | MacPherson | 280—96.2 |
| 2,635,704 | 4/1953 | Herreshoff | 180—43 |
| 2,845,279 | 7/1958 | Polhemus et al. | 280—96.2 |
| 2,998,265 | 8/1961 | Kozicki | 180—73 X |
| 3,108,650 | 10/1963 | Chayne et al. | 180—73 |
| 3,177,965 | 4/1965 | Dews | 180—73 |
| 3,283,842 | 11/1966 | Watt | 180—43 X |

A. HARRY LEVY, Primary Examiner

U.S. Cl. X.R,

280—124